(12) United States Patent
Bolton et al.

(10) Patent No.: US 10,474,764 B1
(45) Date of Patent: Nov. 12, 2019

(54) SYSTEM AND METHOD FOR LOCATION OPTIMIZATION FOR BDMS

(71) Applicant: The Boeing Company, Chicago, IL (US)

(72) Inventors: Roger K. Bolton, Madison, AL (US); Kelsea Cox, Madison, AL (US); James M. Milstead, Madison, AL (US); Joseph P. Simonis, Webster Groves, MO (US); Curtis A. Armstrong, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1082 days.

(21) Appl. No.: 14/334,969

(22) Filed: Jul. 18, 2014

Related U.S. Application Data

(63) Continuation-in-part of application No. 14/064,693, filed on Oct. 28, 2013, now abandoned.

(51) Int. Cl.
*G06F 17/50* (2006.01)

(52) U.S. Cl.
CPC .................... *G06F 17/50* (2013.01)

(58) Field of Classification Search
CPC ............................ G06F 17/50; G06F 17/5009
USPC .................................................. 703/1, 8, 21
See application file for complete search history.

(56) References Cited

U.S. PATENT DOCUMENTS

| | | | |
|---|---|---|---|
| 7,979,247 B2 | 6/2011 | Butterfield et al. | |
| 8,056,046 B2 | 11/2011 | Denby et al. | |
| 8,068,983 B2 | 11/2011 | Vian et al. | |
| 8,589,125 B2 | 11/2013 | Mori et al. | |
| 9,116,850 B2 * | 8/2015 | Vijayan Retnamma | G06F 11/1453 |
| 2002/0183986 A1 | 12/2002 | Stewart et al. | |
| 2005/0257178 A1 | 11/2005 | Daems et al. | |
| 2006/0048880 A1 * | 3/2006 | Blessing | A61F 13/15658 |
| | | | 156/60 |
| 2008/0228409 A1 | 9/2008 | Nelson et al. | |

(Continued)

OTHER PUBLICATIONS

Melin et al. "Modeling and Analysis of High Energy Laser Weapon System Performance in Varying Atmospheric Conditions"., Air Force Institute of Technology. Sep. 2011. 98 Pages.*

(Continued)

*Primary Examiner* — Eunhee Kim
(74) *Attorney, Agent, or Firm* — Toler Law Group, PC

(57) ABSTRACT

A system and method for determining an optimum geographic location using a system of systems. A Design of Experiments is conducted for a particular system of systems architecture using a simulation engine based upon a predefined set of inputs, and Response Surface Models (RSMs) are generated based on the results. The RSMs are evaluated to determine candidate points to minimize or maximize the desired response(s). A candidate geographic location point is set, and one or more truth runs are performed for values in a set of defined second level values. The RSMs are updated based on such truth runs. The process of optimizing, performing a truth run and updating is repeated until the optimal value of the selected variable converges toward a global minimum or maximum, or a predetermined threshold number of iterations is exhausted. The optimum geographic location is designated as the final candidate geographic location point.

20 Claims, 7 Drawing Sheets

(56) References Cited

U.S. PATENT DOCUMENTS

2009/0228293 A1   9/2009  Fowler
2011/0029672 A1*  2/2011  Agneeswaran ....... G06F 9/5044
                                                      709/226
2014/0195210 A1*  7/2014  Calmels ................. G01M 9/08
                                                      703/2

OTHER PUBLICATIONS

Weaver. "A Methodology for Ballistic Missile Defense Systems Analysis Using Nested Neural Networks". Georgia Institute of Technology. Aug. 2008. 107 Pages.*
Cramer et al. "Practical Experience with a Multi-Objective Model-Management Framework Optimization Method". 12th AIAA Aviation Technology, Integration, and Operations (ATIO) Conference and 14th AIAA/ISSM. Sep. 17-19, 2012, Indianapolis, Indiana. 11 Pages.*
Carty, A.—An Approach to Multidisciplinary Design, Analysis & Optimization for Rapid Conceptual Design—9th AIAA/ISSMO Symposium on Multidisciplinary Analysis and Optimization—Sep. 4-6, 2002, Atlanta, Georgia.
European Search Report for Application No. 14188692.9 dated Mar. 16, 2015, 9 pgs.
Booker, Andrew J., et al., "A Rigorous Framework for Optimization of Expensive Functions by Surrogates," CRPC-TR98739-S, Feb. 1998, revised Apr. 1998; Center for Research on Parallel Computation, Rice University, 25 pgs.
Booker, Andrew J., et al., "Optimization Using Surroage Objectives on a Helicopter Test Example," CRPC-TR97734S, Dec. 1997; Center for Research on Parallel Computation, Rice University.
Bowcutt, Kevin G., et al., "Advancements in Multidisciplinary Design Optimization Applied to Hypersonic Vehicles to Achieve Closure," American Institute of Aeronautics and Astronautics, 15th AIAA International Space Planes and Hypersonic Systems and Techonologies Commerce, Apr. 28-May 1, 2008, Dayton, OH, 12 pgs.
Cramer, Ervin J., et al., "Problem Formulation for Multidisciplinary Optimization," SIAM J. Optimization, vol. 4, No. 4, Nov. 1994, 754-776.
Frank, P. D., et al., "Optimization and Search Methods for Multidisciplinary Design," Boeing Computer Services, Dec. 1, 1991, 72 pgs.
Lehner, S. G., et al., "Advanced Multidisciplinary Optimization Techniques for Efficient Subsonic Aircraft Design," 48th AIAA Aerospace Sciences Meeting Including the New Horizons Forum and Aerospace Exposition, Jan. 4-7, 2019, Orland, FL, 12 pgs.
Marin, Pablo, et al., "Fixed bed membrane reactors for WGSR-based hydrogen production: Optimisation of modelling approaches and reactor performance," International Journal of Hydrogen Energy, vol. 37, 2012, 4997-5010.
Sobester, Andras, et al., "On the Design of Optimization Strategies Based on Global Response Surface Approximation Models," Journal of Global Optimization, 2005, vol. 33, pp. 31-59.
Wittwer, Jonathan, "Simulation-Based Design Under Uncertainty for Compliant Microelectomechanical Systems," Brigham Young University, BYU ScholarsArchive, Apr. 2005, 214 pgs.

* cited by examiner

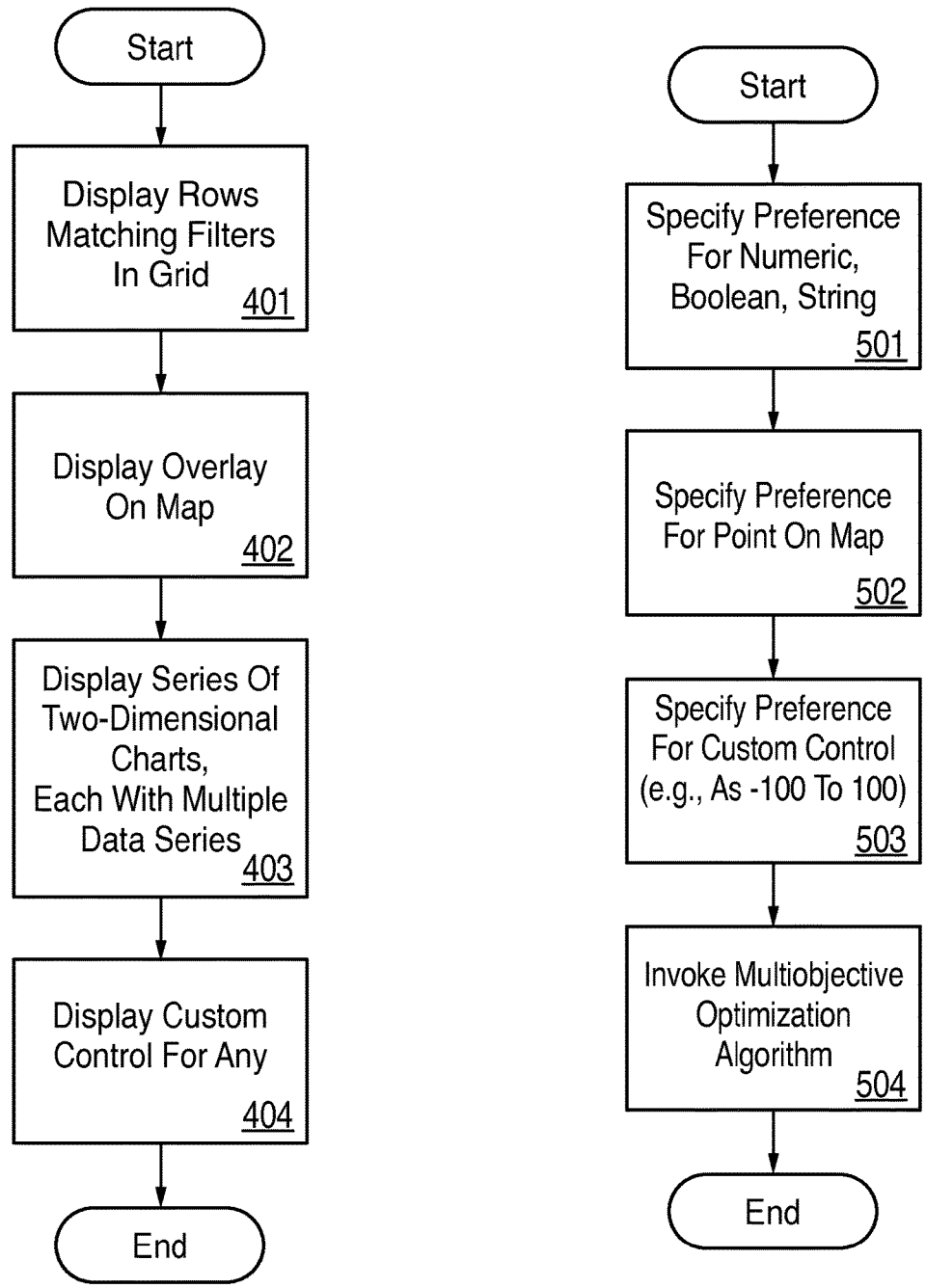

SYSTEM AND METHOD FOR LOCATION OPTIMIZATION FOR BDMS

FIELD

This invention relates generally to the visualization and optimization of system of systems architectures, and more particularly to the optimization of systems of systems architectures used for identifying optimal element placement for ballistic missile defense systems.

BACKGROUND

A System-of-Systems (SoS) is a collection of dedicated systems which pool resources and capabilities to create a new, more complex system which offers more functionality and performance than simply the sum of the constituent systems.

Developing optimal architectures for large System-of-Systems requires performing trades among many different disciplines. For example, in the missile defense domain the selection of sensors and interceptors, where they are positioned, and their properties such as burn-out velocity, detection range, field of view, or communications latency all have an impact on the overall performance of the system—i.e., how well it defends against incoming threats. The sheer volume of different architectural possibilities makes timely visualization of the design space a significant challenge.

System-of-Systems (SoS) Multidisciplinary Design, Analysis, and Optimization (MDAO) is used to determine which architectural components (systems) have the most impact on the overall performance of the overall system. A system-level model or simulation is constructed and a design of experiment (DoE) performed to vary architectural components or component properties to determine how the overall system performs under a multitude of different configurations. Phoenix Integration's ModelCenter is a standard tool used to perform DoEs. A typical ModelCenter workflow for System of Systems analysis problems involves an analyst executing a DoE, filtering out a set of "interesting" results from among the millions of alternatives, and presenting the filtered responses to a customer for review. Real-time manipulation of data and visualization of results directly from ModelCenter are often impractical for models requiring long execution cycles. As a result, the filtered responses provide a static presentation without any ability to respond in real-time to "what-if" scenarios or questions not considered in the original DoE.

A ballistic missile defense system (an example of a System of Systems) requires elements deployed at various locations and optimized for both optimal homeland defense and for expense. Current methods of simulating such ballistic missile defense systems require long and impractical execution times.

Accordingly, there is a need for a more efficient way to evaluate a System of Systems simulation of a ballistic missile defense system.

SUMMARY

The present disclosure is addressed to a computer-implemented system and method for determining an optimum geographic location using a system of systems. A Design of Experiments is conducted for a particular system of systems architecture using a simulation engine running on a processor and based upon a predefined set of inputs. The predetermined inputs comprise a set of points defining possible geographic locations. The results of the Design of Experiments are stored in a database in a memory. One or more Response Surface Models are generated based on the results of the Design of Experiments and the one or more Response Surface Models are stored in memory. The one or more Response Surface Models are optimized by selecting, via a graphical user interface on a user display, a variable to be optimized and then iteratively running the one or more Response Surface Models until the selected variable is optimized to an optimal value. The optimal value of the selected variable has an associated geographic location point and a candidate geographic location point is set as the geographic location point associated with the optimal value of the selected variable. Truth runs are performed based on the optimal value of the selected variable. The one or more Response Surface Models are updated based on results of the truth run. The optimizing, performing truth runs and updating steps are repeated until the optimal value of the selected variable reaches a predetermined threshold or until a predetermined number of iterations of the optimizing step have been performed. Finally, the optimum geographic location is designated as the candidate geographic location point.

In one further embodiment, the predefined set of inputs also includes a set of at least two second level values and the truth runs are performed while varying all points within the set of at least two second level values. In the alternative, an aggregate function may be applied to the set of at least two second level values during the truth runs. The set of points defining geographic locations may be a grid of points or may be points within an area defined by a reference point and minimum and maximum values for azimuth and range from the reference point.

In another further embodiment, the candidate geographic location identified after each optimization may be visually displayed on a map shown on a display device. In a still further embodiment, an output file may be generated that includes the optimized result of the optimum geographic location.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which:

FIG. 4 is a flow chart showing the visualization operations performed by the optimization system of FIG. 1A;

FIG. 5A is a flow chart showing a first embodiment of the optimization operations performed by the optimization system of FIG. 1A;

DETAILED DESCRIPTION

In the present disclosure, like reference numbers refer to like elements throughout the drawings, which illustrate various exemplary embodiments of the present invention.

Figure 1A:
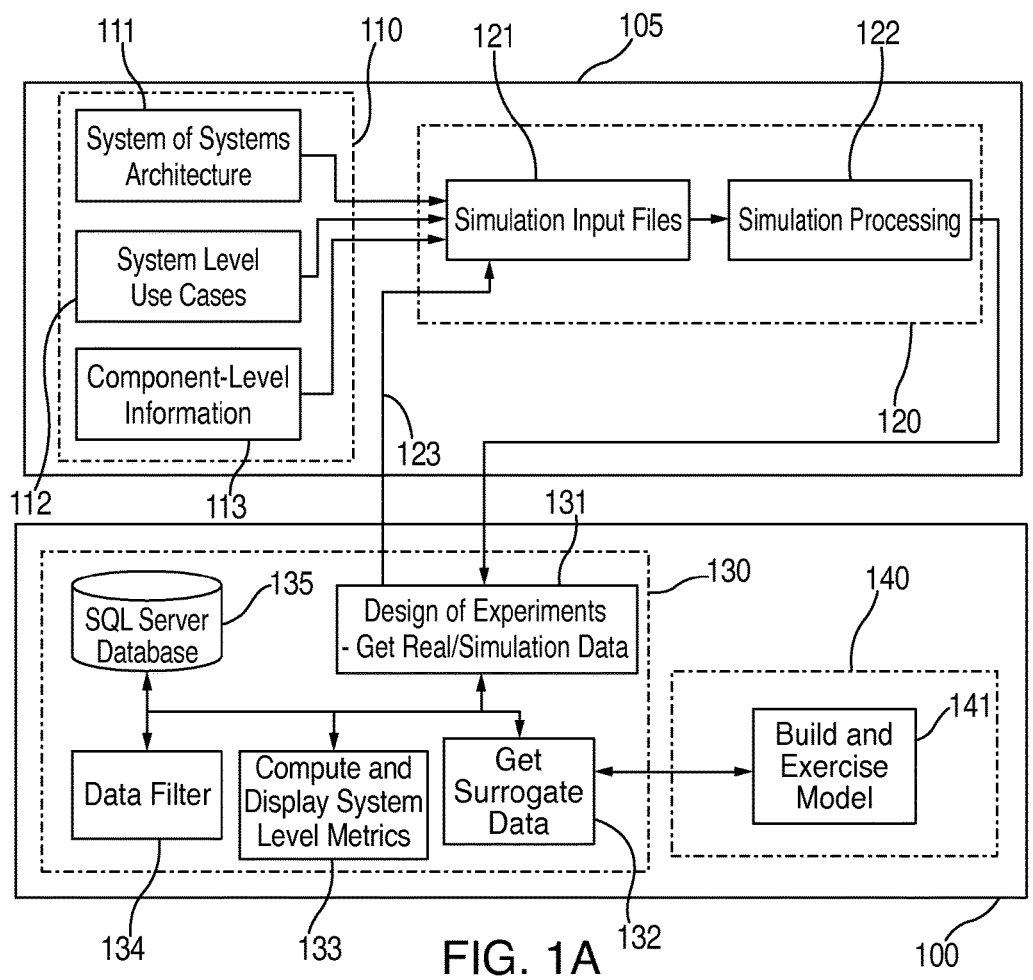
FIG. 1A is a block diagram of an optimization system according to a presently preferred embodiment.

Referring now to the drawings and in particular to FIG. 1A, a block diagram is shown that is useful in understanding the operation of the visualization and optimization system 100 according to a preferred embodiment. In particular, visualization and optimization system 100 receives simulation results from a simulation system 105, which are generated under various system/component configurations set under the control of a design of experiments module 131 (discussed below). The simulation results are stored in a database, for example, an SQL server database 135. As discussed in more detail below with respect to FIG. 2, the visualization and optimization system 100 processes the simulation results and generates Response Surface Models from the simulation results. A Response Surface Model is a computationally efficient mathematical model that approximates a single response quantity (the dependent variable) as function of one or more independent variables. The response quantity is typically generated from experimental data or using computer simulation data. In the preferred embodiment, the Response Surface Models are then used to generate information about the operation of the system of systems at inputs different than that used for the various simulation runs under the design of experiments and are used as a part of the optimization process. Once RSM models are verified for validity against truth models, their use significantly reduces the number of simulations that must be executed under the design of experiments and thus also significantly reduces the associated runtime, and also greatly increases the number of variables which can be considered in the analysis and reduces the cycle time for completing a particular analysis.

The operation of the simulation system 105 may be conventional. Systems information 110 is input into a modeling system 120 to simulate the operation of the system of systems for a controlled set of parameters. The simulation information 110 may include, for example, information 111 about the particular system of systems architecture, information 112 about system level use cases and component-level information 113. The modeling system 120 may be any conventional system for modelling a system of systems, including, for example, ModelCenter from Phoenix Integration. The modeling system 120 may include an input section 121 for receiving the simulation information 110 and a simulation processing section 122. Input section 121 also has a separate input 123 used to receive information from the design of experiments module 131 that is used vary the simulation information 110 as part of a predetermined design of experiments. The simulation input section 121 forwards the simulation input information to the simulation processing section 122 in a step-wise manner for processing (i.e., each step correspond to a defined set of input parameters corresponding to particular and controlled variation to an original component property or architectural component, with the variations under the control of input 123) and output. The output of the simulation processing section 122 consists of a series of sets of simulation results, each set corresponding to a particular set of input parameters.

The visualization and optimization system 100 includes two sub-systems. First, a user-interface system 130 provides a framework for generating output displays and also includes a number of modules 131-135 for generating, filtering, processing and displaying the simulation results. User-interface system 130 includes design of experiments module 131, an SQL server database module 135, a data filter module 134, a system level metrics display module 133 and a surrogate model control module 132. Second, a modeling system 140 is used to build and exercise the response surface models for the current system of systems. Modeling system 140 includes a module 141 for building and exercising response surface models. The operation of each subsystem and the respective modules is explained in conjunction with FIGS. 2A, 2B and 2C.

Figure 1B:
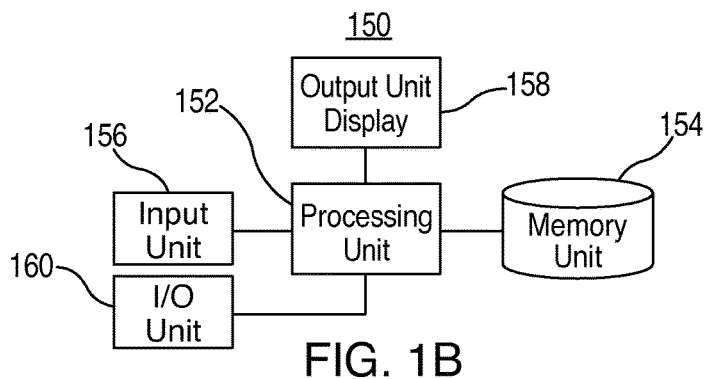
FIG. 1B is a block diagram of a computer apparatus for operating the optimization system.

As one of ordinary skill in the art will readily recognize, the visualization and optimization system can be realized in hardware, software, or a combination of hardware and software. A system according to the preferred embodiment can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. For example, a general purpose computer 150 is shown in FIG. 1B which includes a processing unit 152 (e.g., computer processor), a memory unit 154 (e.g., hard disk, RAM, ROM) an input interface 156 (e.g., keyboard), an output device 158 (e.g., a user display) and an input/output device 160 (e.g., disk drive, USB interface, etc.).

The Design of Experiments module 131 controls, via line 123, the simulation runs performed by simulation processing section 122. In particular and referring to FIG. 2A, the first step in performing the Design of Experiments is preferably to select the ranges for the component parameters (step 201). This requires evaluating and setting ranges on the component-level information 113 shown in FIG. 1A. Next, an area may be selected (e.g., the area 606 shown in FIG. 6A) for component geodetics locations (step 202*a*). This information may be based on, for example, information within the system level use cases 112 shown in FIG. 1A. The area may be a rectangular grid, e.g., an n×m grid, or may be based on a particular azimuth and range from a particular based point. For the latter, a user may enter a reference point and then minimum and maximum values for azimuth and range from such reference point. At step 202*b*, second level values (variables) are specified. The second level values are variables that change to determine the performance measurement of a given location. For example, to calculate the defended area for any given sensor location, a number of launch point location and aim point location combinations must be evaluated. The second level values in this example constitute combinations of launch point location and associated aim point locations. Once the selections are made (from steps 201, 202*a* and 202*b*), the Design of Experiments is executed at step 203. As discussed above, the Design of Experiments involves performing a series of simulation runs (by simulation processing section 122) in step-wise manner varying the input information. The Design of Experiments module 131 (FIG. 1A) receives the simulation data (the "real" data) and computes a hash function for each result (step 204) and then stores the results and associated hash function in the SQL server database 135 (step 205). Prior to storing the data, the simulation data from modelling system 120 is denormalized into a flat file (e.g., a comma-separated value, or CSV, file) which is used to generate a single database table to hold the data. This de-normalization process is important so that system 100 may be generic and work on any data. The data types of the input data (string, integer, decimal, Boolean) is automatically detected and a database schema (table) is generated. A user may specify which fields are to be used as input filters for driving what-if scenario analysis and indices are built on the database table to allow system 100 to query the data quickly. The data is then input from the flat file into the new database table in database 135.

Figures 2A, 2B:
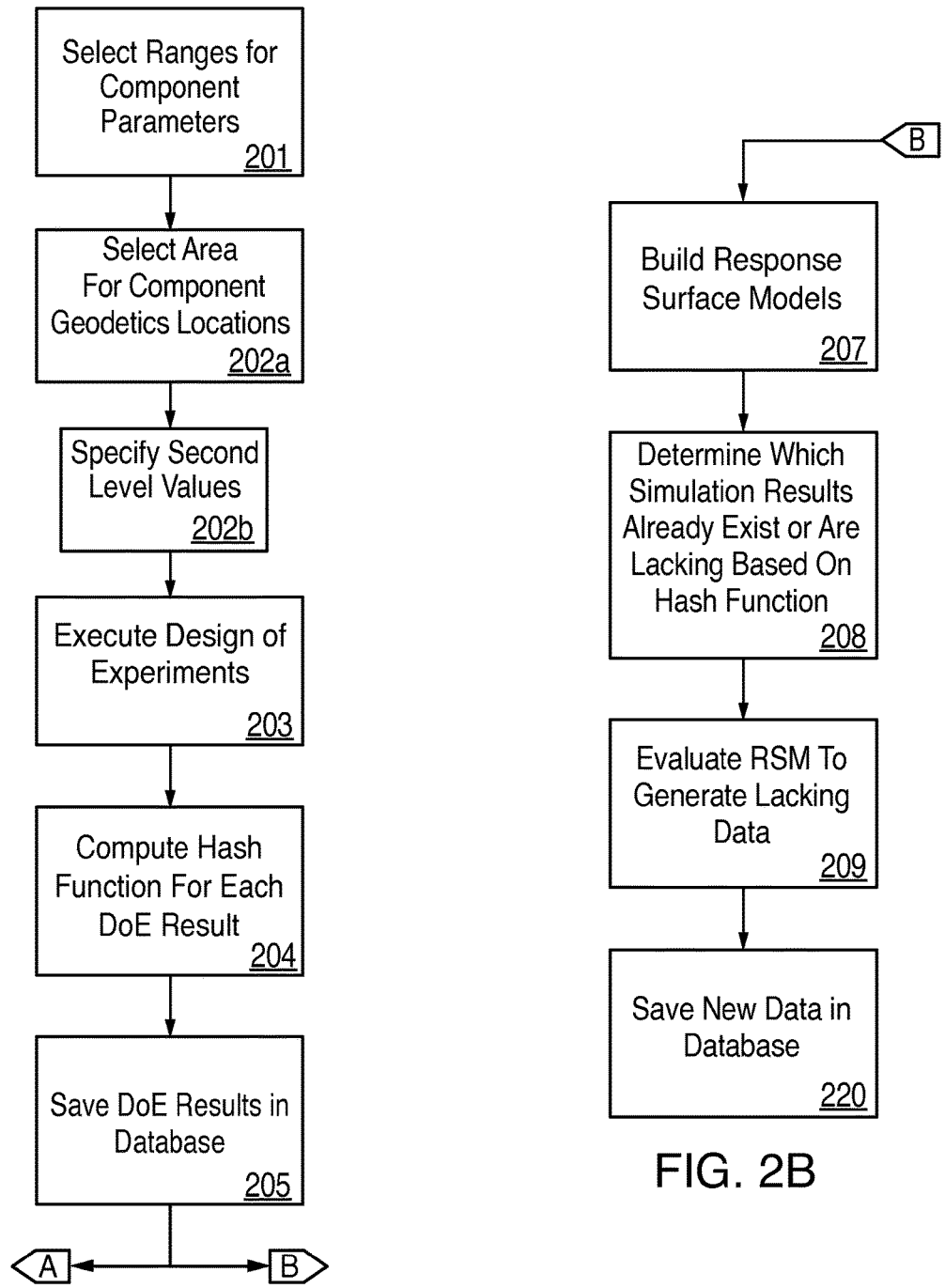
FIGS. 2A, 2B and 2C show a flow chart showing the operation of the optimization system of FIG. 1A.

Referring now to FIG. 2B, once the data is imported into the database, Response Surface Models (RSMs) are generated to represent the data (step 207) under the control of the Get Surrogate Data module 132. In the presently preferred embodiment, module 132 is coupled to modeling system 140 to perform this step. Modeling system 140 is preferably a Boeing-developed tool called Design Explorer, however other tools providing the same functionality may be alternatively used to generate the Response Surface Models. To build the model, the dataset is split into multiple models based on a Cartesian product of all possible values of all the Boolean and string variables. Each combination of Boolean/string variables becomes a model, since no interpolation can be done between Boolean or string values. Next, it is determined which simulation results are lacking (missing) in database 135, based on the previously generated hash functions (step 208). If data is missing, the appropriate RSM is evaluated to generate the missing data (step 209). As discussed below, if a user specifies data that does not already exist in database 135 during the optimization step 213, an associated Response Surface Model is likewise invoked to generate the missing data. Finally, the generated data (called "surrogate data" because it is based on the RSM and not on the original simulation) is automatically imported into database 135, thereby seamlessly merging the surrogate data with the existing simulation (real) data, at step 220.

Figure 2C:
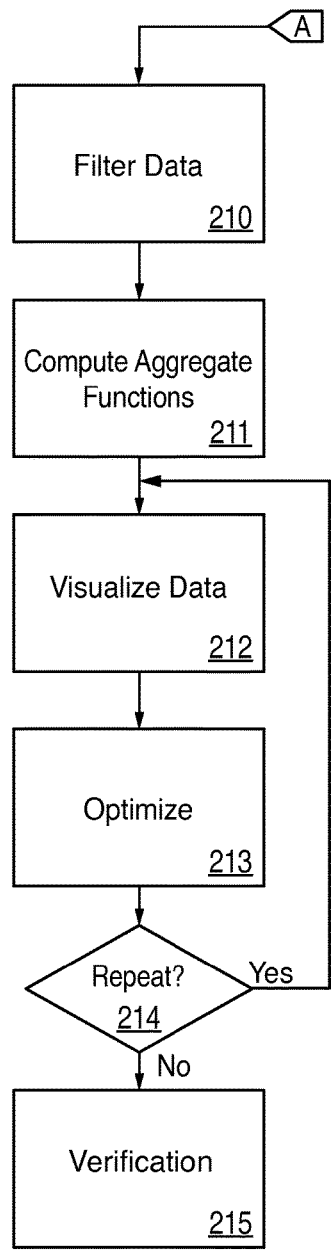
Figure 3:
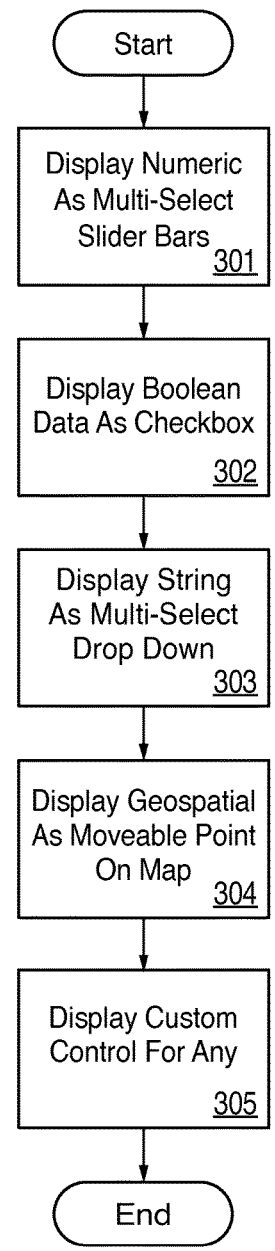
FIG. 3 is a flow chart showing the filtering operations performed by the optimization system of FIG. 1A.

FIG. 2C shows the steps performed in the actual visualization and optimization of the System of Systems being evaluated (as defined by the parameters 111 shown in FIG. 1A). The first step performed is to filter the data (step 210). Step 210 is performed by the data filter module 134 (FIG. 1A) and involves a number of discrete tasks (as shown in FIG. 3) setting up user controls to facilitate the what-if scenario generation. Numeric inputs (integer, decimal) may be displayed as slider bar controls with a minimum and maximum value which allows a user to specify a range of values of interest (step 301). Boolean values may be displayed as check boxes, which may also enable/disable display of an element on a map (step 302). Strings may be displayed as multi-select drop down controls to allow selection of multiple values (step 303). A map may be displayed to show geospatial elements, which elements may also be moved to different positions on the map by a user (step 304). Finally, interfaces may be provided to build new data filtering controls which can interact with the other "out-of-the-box" controls (step 305).

Once the user has specified filtering options, aggregate functions are computed based on the inputs (step 211). System 100 generates dynamic database queries to perform a "group by" operation on the selected values to yield a set of rows that match the filter (primary results), as well as a subset of rows that match each row in the filtered set but contain fields that were not part of the filter (secondary results). This yields a 1-to-many relationship out of a flat database table. The secondary results can then be used as input to an aggregate function to compute values for each row. As a practical example of how this is used—in missile defense a typical metric is "defended area" which is determined by assessing the performance of the system at various "aim points". A simulation run is performed for each aim point, under a given set of conditions. Those conditions become the filter, and the individual runs at each aim point under those same conditions become the subset (secondary results) of "many" that can be used to compute the aggregate defended area function. The filtering user interface is programmatically generated and then tailorable to insure only relevant database fields are displayed. In this way, the user interface is simplified for non-technical personnel (such as marketing or business development personnel) who are familiar with the system operation and parameters but not the underlying simulation models and database structure.

Referring now to FIGS. 2C and 4, a visual view of the data is provided by system 100 (step 212) (see also FIGS. 6A and 6B discussed below). In particular, a two-level grid control is preferably provided to show the rows matching the filters (primary rows), as well as the subset rows for each primary row that also match the filter but do not include the filtered columns themselves (step 401). An overlay may be displayed on the map generated from the filtered primary or secondary rows (step 402). A series of N two-dimensional charts, each with M series of X,Y data is generated which allows visualization of four variables against each other without relying on three-dimensional charts (step 403). Finally, as with filtering, interfaces are provided for building new visualization controls which can operate on the filtered data and computed aggregate functions (step 404).

Figure 7:
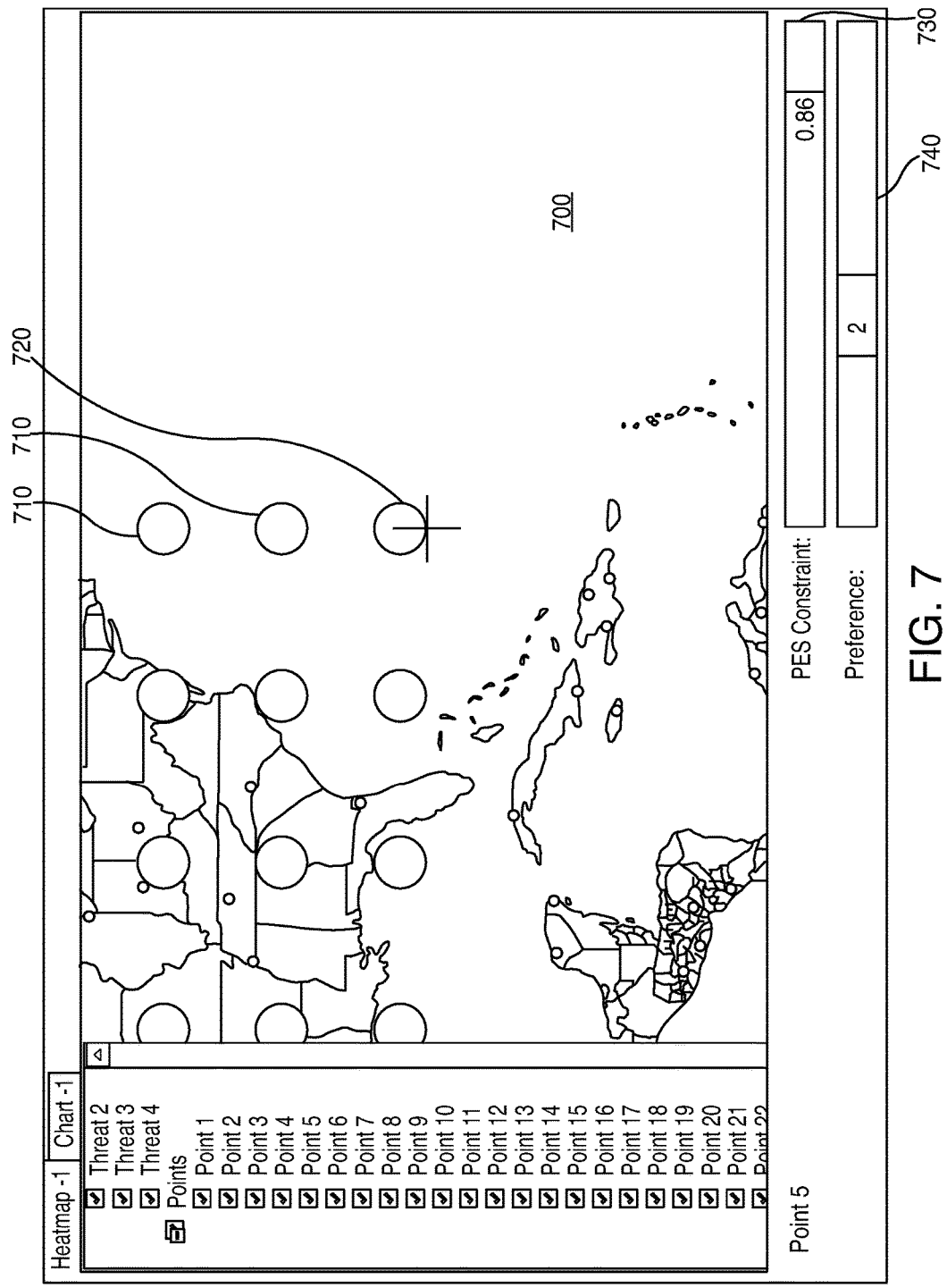
FIG. 7 is a close-up of a screen shot of the graphical user interface showing how the location preferences are identified.

Referring now to FIGS. 2C and 5A, in one embodiment of optimize step 213, a user, by way of user interface controls, specifies preferences by selecting a particular level of importance by, preferably, adjusting a slider between a level of minimization (−100) and maximization (+100) for each (or a selected subset of) the fields for the data in the database (for example, each filter may be available as an adjustable slider here) (step 501). A user is also able to specify preferences for locations via a map (e.g., as shown in FIG. 7, a user may select an area on a map) (step 502). In line with the filter step 304, an interface is provided to implement a custom user control to gather corresponding preference values for any custom user controls (step 503). Thereafter, another response surface model is generated based on the filtered data and user preferences and the model is evaluated to get the optimized results which are displayed using the visualization controls (step 504).

Figure 5B:
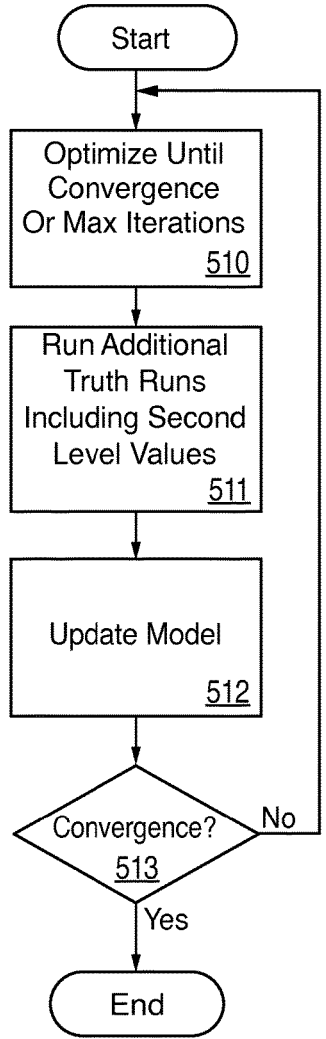
FIG. 5B is a flow chart showing a second embodiment of the optimization operations performed by the optimization system of FIG. 1A.

Referring now to FIGS. 2C and 5B, a second embodiment of optimize step 213 is shown which runs iteratively until certain conditions are met. For example, when modelling a ballistic missile defense system, one goal is to identify asset locations (e.g., the locations of sensors and/or interceptors) that provide complete protection for the identified defended area under a hypothetical engagement scenario. Thus, in optimization step 213, the model is iteratively varied over the range of second level values until asset locations are identified which provide complete protection. In particular, a user may select a response to be minimized or maximized and a maximum number of the local optimization iterations, and the modelling system runs based on such settings (step 510). Markers, e.g., stars, may be placed on the screen to show where the additional runs are being made. After these runs are complete, the system automatically updates the model and runs the same process until the user-defined threshold for local optimization or optimization sequences is met. Each time a new optimal point is found, the system performs a truth run by automatically running that point, preferably also varying the second level values, through the full simulation model to get a true value for the parameter of interest (step 511). In some circumstances, however, the second level values may not need to be varied in step 511. In other circumstances, one or more aggregate functions may be applied to the second level values in step 511. The truth run is essentially a second level design of experiments run on the simulation engine 120. The status of these runs may be displayed by filtering the data; however, no user input is necessary while the process of optimization and model update continues. Once the data from step 511 is obtained, the Response Surface Model is update to include such data (step 512). After the model is updated, it is tested to determine if it has converged to the desired results (step 513). If the data does not converge during a particular run, the system automatically returns to step 511 to continue optimizing the new model. In this manner, second-level truth evaluations may be embedded into the optimization process—multiple truth executions are required to generate a single truth point. In addition, the system may show the locations under evaluation in real time as icons on a geospatial map. This provides a user with an understanding into algorithm execution and context for manual evaluation or verification of results. In this second embodiment, the implementation of an iterative truth-based optimizer in process (versus identification of optimal based on user-supplied preferences in the first embodiment) updates the RSM model in a loop and best guess truth values evaluated until the system converges on the best answer. This is contrasted with the first embodiment in which optimization occurs by a brute force approach that runs all possible values within given range through RSM models. Where the system has determined that the threshold for optimization has been meet and has converged to a desired result, the system generates an output for display on an output device 158, or alternatively generates an output file, which include the optimized result of the optimum geographic location that provides complete protection for the identified defended area.

Based on the optimized results, at step 214 in FIG. 2C a user can elect to either repeat the visualization and optimization steps based on modified inputs or to proceed to the verification step 215. verification of the Response Surface Models is performed by performing a full simulation run based on the optimal inputs generated during the optimize step 213 and then comparing that output (based on actual simulation data) with the output generated with the Response Surface Models in step 213. In a presently preferred implementation, modeling system 120 is invoked to run this verification level simulation.

Figure 6A:
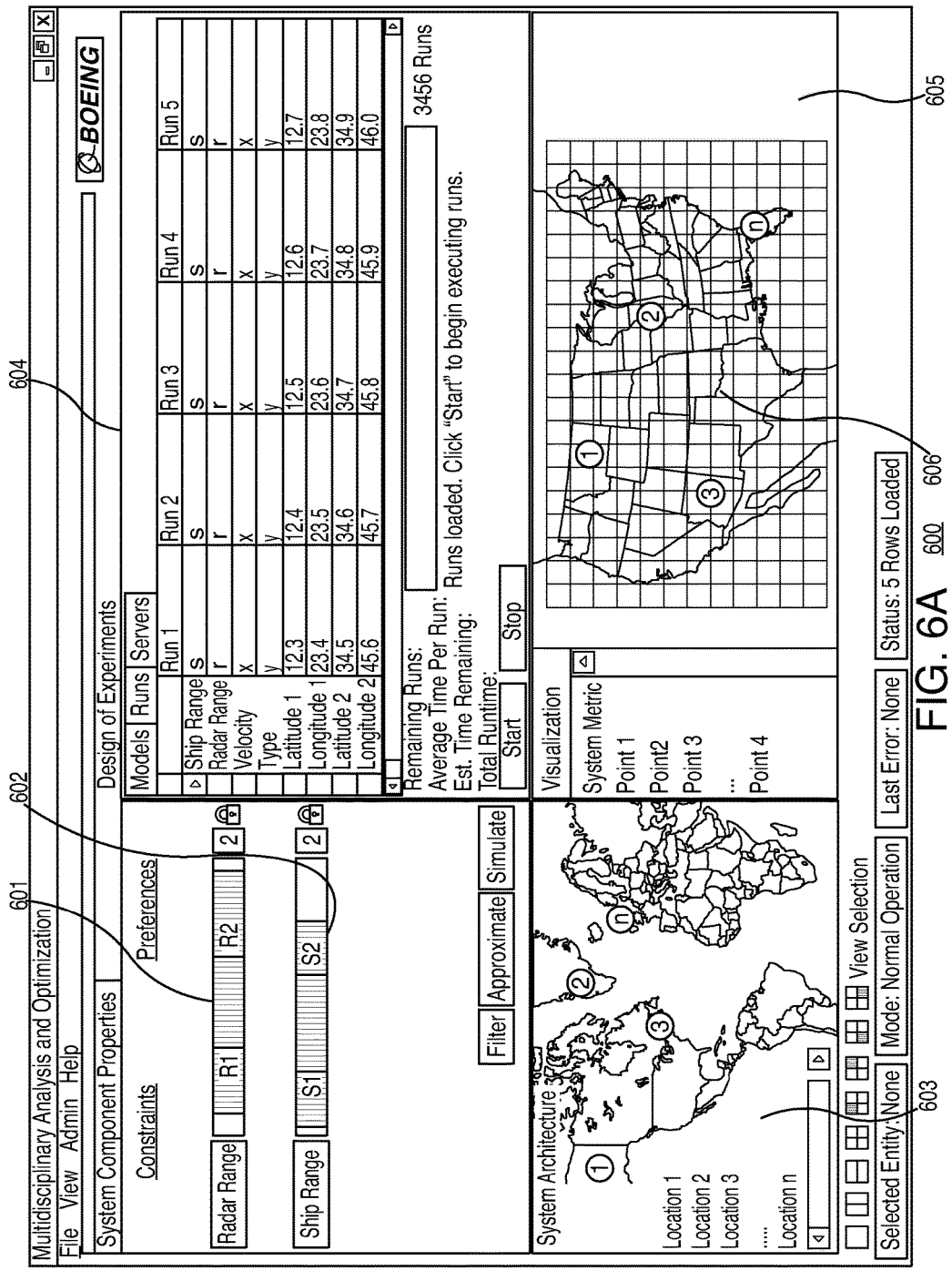
FIGS. 6A and 6B are screen shots of the graphical user interface used to control and display the output of the optimization system of FIG. 1A.

Referring now to FIG. 6A, a graphical user interface 600 is shown for use in controlling a first part of the visualization and optimization system of the preferred embodiment. In particular, graphical user interface 600 includes slide controls 601, 602 and a map 603 for setting a range (or positions) for the component parameters (corresponding to step 201 in FIG. 2A). In addition, graphical user interface 600 also includes a map 605 for setting a grid 606 for component geodetics locations (corresponding to step 202*a* in FIG. 2A). This is shown in more detail in FIG. 7 by the location of grid markings 710, 720 on a map 700 that set forth certain of the selected portions. In addition, FIG. 7 shows slider controls 730, 740 for setting geodetic constraint/preference information for a selected point 720. Finally, graphical user interface 600 includes a table 604 that shows how the Design of Experiments step 203 (FIG. 2A) will be carried out (in terms of sequential runs).

Figure 6B:
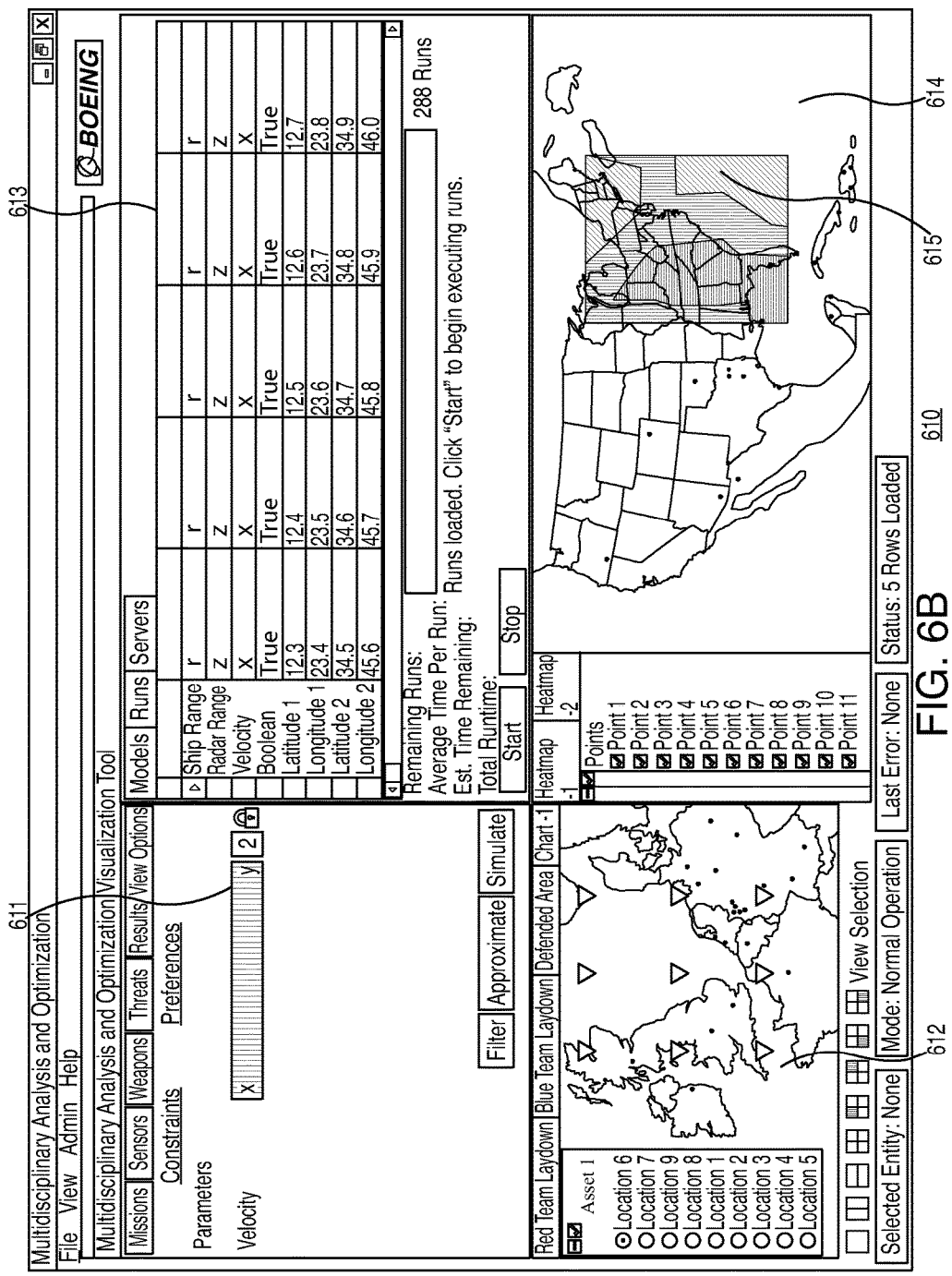

Referring now to FIG. 6B, a second graphical user interface 610 is shown for use in controlling a second part of the visualization and optimization system of the preferred embodiment. In particular, graphical user interface 610 includes a slider 611 that is used to set the preference level for a particular variable. The preference level corresponds to a weighting or significance provided to such variable, and preferably ranges from −100 to +100. In addition, the second graphical user interface 610 also includes a map 612 which allows a user to move points to new locations as part of the optimization process. Further, the second graphical user interface 610 includes a table 613 showing the data from the Design of Experiments output. Finally, the second graphical user interface 610 includes a heat map 614 providing a visualization of the system level metrics (shown by the different level of shading in FIG. 6B).

The figures include block diagram and flowchart illustrations of methods and systems according to the preferred embodiment. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A computer-implemented method for determining a geographic location, the method comprising:
   receiving first user input at a processor, the first user input identifying a plurality of geographic locations;
   performing, at the processor, a plurality of simulation runs based on the first user input;
   generating a plurality of hash function results, wherein each hash function result of the plurality of hash function results corresponds to a respective simulation run of the plurality of simulation runs;
   generating a plurality of models based on the plurality of hash function results;
   receiving second user input, the second user input identifying a selected variable and a threshold;
   identifying a particular geographic location of the plurality of geographic locations by iteratively performing iterative steps, the iterative steps comprising:
      identifying a potential geographic location of the plurality of geographic locations;
      performing a simulation using the plurality of models and the potential geographic location to identify an updated value for the selected variable; and
      updating the plurality of models based on results of the simulation, wherein the results of the simulation include the updated value, wherein the iterative steps are repeated until the updated value satisfies the threshold or a user specified number of repetitions have been performed, and wherein the particular geographic location corresponds to the potential geographic location identified in the last iteration performed; and
   generating an output that identifies geographic location for providing protection by placement of elements of a ballistic missile defense system in an area to be defended that corresponds to the particular geographic location.

2. The computer-implemented method of claim 1, further comprising generating surrogate data using the plurality of models, wherein the potential geographic location is identified by comparing a first value for the selected variable in one of the surrogate data or the hash function results to a second value for the selected variable, the first value associated with the potential geographic location, the second value associated with a second potential geographic location of the plurality of geographic locations.

3. The computer-implemented method of claim 2, wherein the potential geographic location is identified responsive to the first value being greater than the second value.

4. The computer-implemented method of claim 2, further comprising identifying a plurality of unsolved variables based on the plurality of hash function results, wherein the surrogate data is generated based on the plurality of unsolved variables.

5. The computer-implemented method of claim 1, wherein the first user input corresponds to an area selected on a map.

6. The computer-implemented method of claim 1, wherein the first user input further comprises a plurality of variables, wherein the performing the plurality of simulation runs includes:
   performing a first simulation run with a third value for a first variable of the plurality of variables; and
   performing a second simulation run with a fourth value for the first variable.

7. The computer-implemented method of claim 6, wherein the iterative steps further comprise:
   adjusting at least one variable of the plurality of variables after performing the simulation, wherein the plurality of variables do not include the selected variable; and
   performing a second simulation after adjusting the at least one variable of the plurality of variables.

8. A system comprising:
   a processor;
   a memory communicatively coupled to the processor, the memory storing instructions that are executable by the processor to perform operations comprising:
      receiving first user input, the first user input identifying a plurality of geographic locations;
      performing a plurality of simulation runs based on the first user input;
      generating a plurality of hash function results, wherein each hash function result of the plurality of hash function results corresponds to a respective simulation run of the plurality of simulation runs;
      generating a plurality of models based on the plurality of hash function results;
      receiving second user input, the second user input identifying a selected variable and a threshold;
      identifying a particular geographic location of the plurality of geographic locations by iteratively performing iterative steps, the iterative steps comprising:
         identifying a potential geographic location of the plurality of geographic locations;
         performing a simulation using the plurality of models and the potential geographic location to identify an updated value for the selected variable; and
         updating the plurality of models based on results of the simulation, wherein the results of the simulation include the updated value, wherein the iterative steps are repeated until the updated value satisfies the threshold, and wherein the particular geographic location corresponds to the potential geographic location identified in the last iteration performed; and
      generating an output that identifies the particular geographic location.

9. The system of claim 8, wherein the first user input indicates a reference point, a range of azimuth values, and a range distance.

10. The system of claim 9, wherein each geographic location of the plurality of geographic locations is located within the range distance from the reference point.

11. The system of claim 8, wherein the iterative steps further include updating a display to identify the potential geographic location after the potential geographic location is identified.

12. The system of claim 8, wherein the output is an output file.

13. A non-transitory computer readable memory storing instructions that are executable by a processor to perform operations comprising:
   receiving first user input, the first user input identifying a plurality of geographic locations;
   performing a plurality of simulation runs based on the first user input;
   generating a plurality of hash function results, wherein each hash function result of the plurality of hash function results corresponds to a respective simulation run of the plurality of simulation runs;
   generating a plurality of models based on the plurality of hash function results;

receiving second user input, the second user input identifying a selected variable and a threshold;

identifying a particular geographic location of the plurality of geographic locations by iteratively performing iterative steps, the iterative steps comprising:

identifying a potential geographic location of the plurality of geographic locations;

performing a simulation using the plurality of models and the potential geographic location to identify an updated value for the selected variable; and updating the plurality of models based on results of the simulation, wherein the results of the simulation include the updated value, wherein the iterative steps are repeated until a user specified number of repetitions have been performed, and wherein the particular geographic location corresponds to the potential geographic location identified in the last iteration performed; and generating an output that identifies the particular geographic location.

14. The non-transitory computer readable memory of claim 13, wherein the plurality of simulation runs corresponds to a Design of Experiments.

15. The non-transitory computer readable memory of claim 14, wherein the plurality of models corresponds to a plurality of Response Surface Models.

16. The non-transitory computer readable memory of claim 15, wherein the simulation corresponds to a truth run.

17. The non-transitory computer readable memory of claim 13, further comprising generating surrogate data using the plurality of models, wherein the operations further comprise merging the hash function results with the surrogate data.

18. The non-transitory computer readable memory of claim 17, wherein the hash function results and the surrogate data include a plurality of values for the selected variable, each value of the plurality of values associated with a corresponding geographic location of the plurality of geographic locations.

19. The non-transitory computer readable memory of claim 18, wherein the potential geographic location is identified responsive to a first value of the plurality of values being higher than all other values of the plurality of values, wherein the first value is associated with the potential geographic location.

20. The non-transitory computer readable memory of claim 13, wherein the particular geographic location corresponds to an optimum geographic location for providing protection by placement of elements of a ballistic missile defense system in an area to be defended.

* * * * *